P. R. PETERSON.
PACKING RING.
APPLICATION FILED JUNE 10, 1918.

1,307,696.

Patented June 24, 1919.

Peter R. Peterson
INVENTOR.
BY J. M. Thomas
ATTORNEY

UNITED STATES PATENT OFFICE.

PETER R. PETERSON, OF SALT LAKE CITY, UTAH, ASSIGNOR TO PETERSON-HARNDON CLUTCH COMPANY, OF SALT LAKE CITY, UTAH, A CORPORATION.

PACKING-RING.

1,307,696.

Specification of Letters Patent.   Patented June 24, 1919.

Application filed June 10, 1918.   Serial No. 239,324.

*To all whom it may concern:*

Be it known that I, PETER R. PETERSON, a citizen of the United States, residing at Salt Lake City, in the county of Salt Lake and State of Utah, have invented certain new and useful Improvements in Packing-Rings, of which the following is a specification.

My invention relates to packing rings, and has for its object to provide a new and useful packing for use in machinery whereby lubricating oil may be retained and more evenly distributed on the wearing parts than has been the practice.

These objects I accomplish with the device illustrated in the accompanying drawings in which similar letters and numerals of reference indicate like parts throughout the several figures and as described in the specification forming a part of this application and pointed out in the appended claims.

Figure 1:
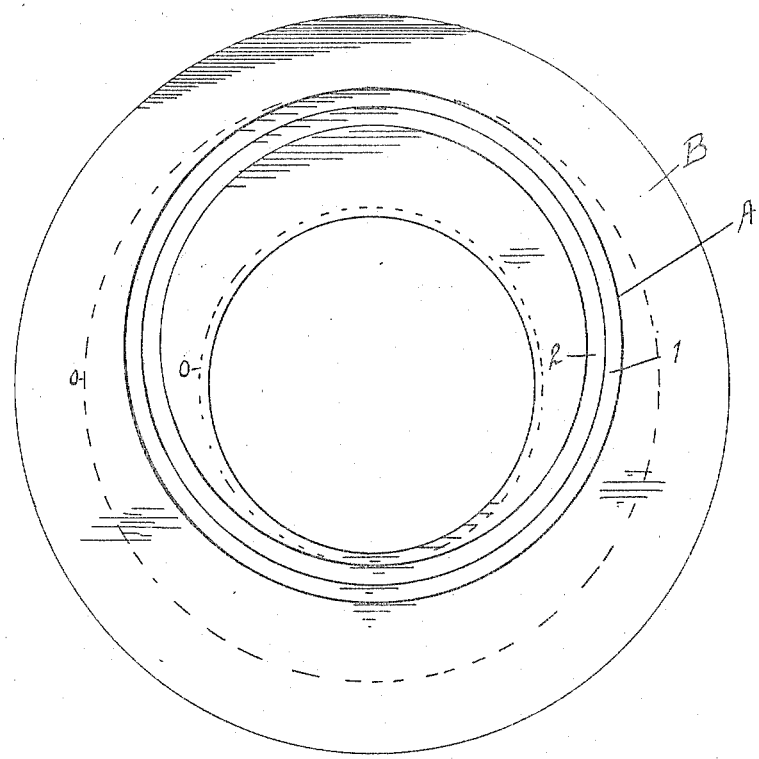
Figure 2:
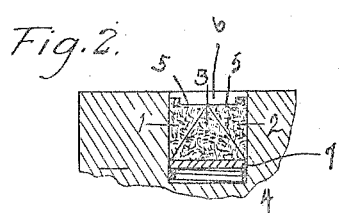
Figure 4:
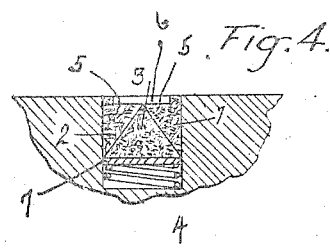
Figure 3:
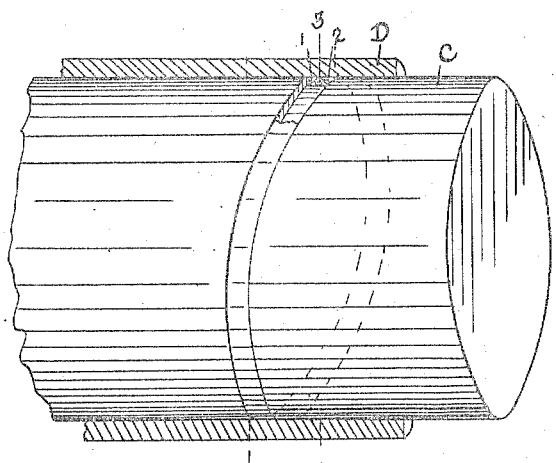

In the drawings in which I have shown a substantial embodiment of my invention, Figure 1 is a plan view of a wearing disk against which another piece of machinery may be operated, such as a rotor in an oil clutch, and which disk is packed with my invention. Fig. 2 is a transverse section of the packing channels showing my packing rings and manner of placing them, showing the springs depressed. Fig. 3 is a portion of a shaft journaled in a sleeve which is packed in accordance with my invention. Fig. 4 is a transverse section of a packing channel showing my packing rings in place therein, and expanded.

Where two plane disk metal surfaces in machinery are operated in contact and it is desirable to pack and lubricate the wearing parts I provide a packing channel A in the face of one of the wearing disks B cut eccentrically therein and to the opposing disk, as shown in Fig. 1. The packing used in said channel A consists of two coacting rings 1 and 2, which are practically triangular in cross section with a portion of the base of each of said rings cut out as at 5 to form an oil chamber 6. Another packing ring 3 practically an isosceles triangle in cross section is placed between the said rings 1 and 2, and when the three rings are in place they fill the said channel except a space at the back of said ring 3 where I provide a plurality of springs 4. The same packing rings 1, 2 and 3 with the springs 4 may be used as a packing of a shaft C and sleeve D as shown in Fig. 3, with the channel cut at an angle from a true cross section of said shaft C, thereby using the excentric principle in cutting the channel as is used in channel A in packing wearing faces, as shown in Fig. 1.

The assembling, operation and novelty of my invention may be more fully understood by the following. The channel is cut excentric and the spring element placed in the bottom of the channel with an annular plate 7 resting thereon. The packing ring 3 is then placed in position in said channel and the rings 1 and 2 on opposed contiguous faces of the rings 3. When in use and lubricating oil is used under pressure from either side of the channel the oil will be distributed and cover a space of the wearing surfaces as indicated between the dotted lines *o—o* as shown in either Fig. 1 or 3 and fluid will not pass the packing. The chamber 6 will fill with the lubricating oil and act as an oil reservoir, while allowing the said rings 1 and 2 to be pressed outwardly and the point of the ring 3 to enter said channel 6 without touching the wearing face adjacent. The pressure of spring elements on the annular plate 7 and ring 3 will hold the wearing faces of the rings 1 and 2 in packing position. I thus provide a novel packing, by means of the three rings, their form and co-operation, and their being placed excentrically.

Having thus described my invention I desire to secure by Letters Patent and claim:—

1. In a packing for machinery the combination of three coacting rings triangular in cross section carried in a channel cut eccentrically of the axis and in the face of one of the wearing elements, and spring elements behind said rings adapted to press them partially out of said channel.

2. In a device of the class described the combination of packing rings carried in a channel cut in the wearing face of one of the elements and excentrically of its axis; and means to hold said rings in contact with the wearing parts.

3. In a packing for machinery the combination of two opposed rings having a portion of their wearing faces cut out; another ring triangular in cross section adapted to bear against the first mentioned rings; a plate contiguous said triangular ring; and springs adapted to press said first mentioned rings partially out of a channel in which said rings are carried.

In testimony whereof I have affixed my signature.

PETER R. PETERSON.